(12) United States Patent
Rutgers

(10) Patent No.: US 10,542,599 B2
(45) Date of Patent: Jan. 21, 2020

(54) LED DRIVER

(71) Applicant: SIGNIFY HOLDING B.V., Eindhoven (NL)

(72) Inventor: Andrew Ulrich Rutgers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/554,781

(22) PCT Filed: Feb. 19, 2016

(86) PCT No.: PCT/EP2016/053587
§ 371 (c)(1),
(2) Date: Aug. 31, 2017

(87) PCT Pub. No.: WO2016/142154
PCT Pub. Date: Sep. 15, 2016

(65) Prior Publication Data
US 2018/0020515 A1   Jan. 18, 2018

(30) Foreign Application Priority Data

Mar. 9, 2015 (EP) .................................... 15158219

(51) Int. Cl.
*H05B 33/08* (2006.01)
*G03B 21/20* (2006.01)
(Continued)

(52) U.S. Cl.
CPC ..... *H05B 33/0845* (2013.01); *G03B 21/2053* (2013.01); *H05B 33/089* (2013.01); *H05B 33/0815* (2013.01); *H05B 33/0818* (2013.01); *H05B 33/0824* (2013.01); *H05B 37/0281* (2013.01); *G03B 21/008* (2013.01);
(Continued)

(58) Field of Classification Search
CPC ........ B60Q 3/044; B60Q 3/14; G03B 21/008; G03B 21/2013; G03B 21/2033; G03B 21/2053; G09G 2320/064; G09G 3/3406; H05B 33/0815; H05B 33/0818; H05B 33/0824; H05B 33/0842; H05B 33/0845;
(Continued)

(56) References Cited

U.S. PATENT DOCUMENTS 6,404,172 B1   6/2002 May
7,560,915 B2   7/2009 Ito et al.
(Continued)

*Primary Examiner* — Renan Luque
(74) *Attorney, Agent, or Firm* — Daniel J. Piotrowski

(57) ABSTRACT

LED driver (1) comprising a switched-mode power converter (10) for providing power to an LED arrangement (100) connected across output terminals of the converter (10), and wherein the converter (10) comprises a number of energy storage elements (L, C) and a first semiconductor switch (Q1); a second semiconductor switch (Q2) connected in series with the LED arrangement (100); a control means (11) realized to generate a second control signal (G2) for the second semiconductor switch (Q2), such that a transition of the second control signal (G2) is delayed relative to a corresponding transition of a first control signal (G 1) for the first semiconductor switch (Q 1). The invention further describes a projection arrangement (2); and a method of driving an LED arrangement (100).

15 Claims, 7 Drawing Sheets

(51) Int. Cl.
*H05B 37/02* (2006.01)
*H02M 1/00* (2006.01)
*G03B 21/00* (2006.01)

(52) U.S. Cl.
CPC ...... *G03B 21/2013* (2013.01); *G03B 21/2033* (2013.01); *H02M 2001/007* (2013.01); *Y02B 20/346* (2013.01)

(58) Field of Classification Search
CPC .............. H05B 33/0854; H05B 33/089; H05B 37/0281
See application file for complete search history.

(56) References Cited

U.S. PATENT DOCUMENTS

| | | | |
|---|---|---|---|
| 8,355,033 B2 | 1/2013 | Deppe | |
| 2007/0285030 A1 | 12/2007 | Okamoto et al. | |
| 2008/0143970 A1* | 6/2008 | Harbers | H04N 9/3105 353/31 |
| 2009/0115343 A1* | 5/2009 | King | H05B 33/0815 315/291 |
| 2009/0256973 A1* | 10/2009 | Bazzani | G09G 3/3426 348/744 |
| 2010/0283322 A1 | 11/2010 | Wibben | |
| 2010/0327835 A1 | 12/2010 | Archibald | |
| 2011/0140621 A1* | 6/2011 | Yi | H05B 33/0854 315/224 |
| 2012/0146528 A1* | 6/2012 | Osterried | H05B 33/0815 315/210 |
| 2013/0069545 A1* | 3/2013 | Seo | H05B 33/0818 315/186 |
| 2013/0215334 A1* | 8/2013 | Matoba | G03B 21/2033 348/760 |
| 2013/0271701 A1* | 10/2013 | Yang | H05B 33/089 349/69 |
| 2013/0272701 A1 | 10/2013 | Yang et al. | |
| 2016/0119988 A1* | 4/2016 | Ruan | H05B 33/0818 315/186 |
| 2016/0366742 A1* | 12/2016 | Lee | H05B 33/0845 |
| 2017/0101052 A1* | 4/2017 | Nagao | H05B 33/0854 |

* cited by examiner

LED DRIVER

CROSS-REFERENCE TO PRIOR APPLICATIONS

This application is the U.S. National Phase application under 35 U.S.C. § 371 of International Application No. PCT/EP2016/053587, filed on Feb. 19, 2016 which claims the benefit of European Patent Application No. 15158219.4, filed on Mar. 9, 2015. These applications are hereby incorporated by reference herein.

FIELD OF THE INVENTION

The invention describes an LED driver, a projection arrangement, and a method of driving an LED arrangement.

BACKGROUND OF THE INVENTION

In a digital light processing (DLP) device that uses a micro-mirror array to cast an image onto a screen, an arrangement of high-power light-emitting diodes (LEDs) can be used as a light source. Apart from their favorably long life-time, an advantage of using LEDs is that they can be switched on and off at very high switching frequencies. Furthermore, the light output essentially follows the current though the LEDs, so that the light output is also characterized by favorably fast rise and fall times. To operate a DLP device, control signals are issued to the micro-mirror array to tilt each micro-mirror according to its contribution in the image being generated. Essentially simultaneously, control signals are issued to the LEDs to regulate the light output according to the image being generated. For example, control signals are issued according to the amount of red, green and blue light required for each pixel of the image, and according to the light intensity of each pixel. A requirement of a power converter supplying current and voltage to the LED load is that the current should be characterized by low overshoot or undershoot and highly accurate on/off timing.

In most such applications, a switched-mode power supply (SMPS) is used to drive the LEDs, which are connected as a load across an output filter of the SMPS. The output filter is generally realized using a capacitor or a pi-filter. The SMPS can provide an output power that is switched rapidly between a high level ("on") and a low level ("off") in a so-called hysteretic mode of operation. Because of the desired high switching frequency, a field-effect transistor (FET) is a suitable choice of switch for this purpose. In this "active" mode, an essentially constant output voltage is provided at the output terminals of the converter, with a certain amount of ripple. A control processor of the micro-mirror array can issue appropriate control signals to the converter that are synchronized with control signals of the micro-mirror array. By generating an appropriate gate signal for the converter FET switch, the converter output can alternate between "active" and "inactive" phases. In this way, a desired level of dimming can be achieved for each color of the LED arrangement according to each pixel of the image array. In some known applications, the lighting load itself can be switched independently of the SMPS. To this end, a switch usually a semiconductor switch can be added in series with the lighting load to turn this on and off as required. Such a control signal is generally referred to as a strobe signal. Here also, a field-effect transistor (FET) is a suitable choice of switch for turning the LED load on and off. In a conventional arrangement, gate control signals for the converter switch and load switch are generally issued simultaneously. However, this can result in a noticeable overshoot (or undershoot) on the LED current, which in turn leads to an overshoot (or undershoot) on the light output. Excess light as a result of an overshoot can be perceived by a viewer, thus detracting from the quality of the viewing experience. In a projection arrangement using such a driver, the micro-mirror timing may have to compensate for an overshoot/undershoot. However, some light is effectively wasted, leading to a reduction in the overall efficiency and brightness.

Therefore, it is an object of the invention to provide an improved way of controlling LED light sources, particularly in a DLP projection arrangement.

SUMMARY OF THE INVENTION

The object of the invention is achieved by the LED driver of claim 1; by the projection arrangement of claim 10; and by the method of claim 12 of driving an LED driving arrangement.

According to the invention, the LED driver comprises a switched-mode power converter for providing power to an LED load connected across output terminals of the converter, and wherein the converter comprises a number of energy storage elements and a first semiconductor switch; a second semiconductor switch connected in series with the lighting load; and a control means realized to generate a first control signal for the first semiconductor switch and a second control signal for the second semiconductor switch, such that a transition of the second control signal is delayed relative to a corresponding transition of the first control signal.

In this context, a signal transition is to be understood as a change between a "high" level (also referred to as "on" or "1") and a "low" level (also referred to as "off" or "0"). A transition can go from low to high, or from high to low. A semiconductor switch is controlled by such an on/off control signal so that it is effectively "opened" or "closed". In the following, it may be assumed that a semiconductor switch comprises a field-effect transistor (FET), preferably a MOS-FET, since this type of semiconductor switch can switch at extremely high frequencies when an appropriate control signal applied to its gate terminal. It may also be assumed that such a control signal is applied to a gate terminal of the switch, so that such a control signal may be referred to as a "gate signal" in the following. A power converter can have more than one semiconductor switch for regulating its operation, for example one kind of converter might have a further semiconductor switch in the form of a diode to ensure that a buffer capacitor can only discharge through the lighting load. In the context of the invention, the converter's "first semiconductor switch" is to be understood as the switch that is used to control the energy transfer between the energy storage components of the converter. Therefore, in the following, the terms "first semiconductor switch" and "converter switch" may be used interchangeably. The terms "second semiconductor switch" and "load switch" may also be used interchangeably in the following.

In the LED driver according to the invention, the control means generates the gate signal for the load switch such that a transition of this load switch gate signal is delayed relative to a corresponding transition of the gate signal for the converter switch. An advantage of the LED driver according to the invention is that, by this approach to the gate signal timing, an overshoot on the LED current can be effectively eliminated or at least reduced to a level that will not result in noticeable behavior on the light output. The LED arrangement can therefore be switched from "off" to "on" with a greater degree of precision, with a minimum time interval until the LED is stable at the desired intensity.

According to the invention, the projection arrangement comprises a digital micro-mirror device for projecting an image onto a screen; an LED arrangement for directing light at the micro-mirror device; a processor for controlling the micro-mirror device and for generating control signals for a driver of the LED arrangement; and at least one LED driver according to the invention for driving the LED arrangement.

An advantage of the projection arrangement according to the invention is that the higher precision in the light output owing to the control signal timing of the inventive LED driver leads to an improvement in the quality in the viewing experience. Images can be projected with more accuracy, without the aliasing that can be perceived in comparable projection arrangements that use prior art LED drivers. A further advantage is an increase in efficiency and brightness. In a projection arrangement according to the invention, the micro-mirrors do not have to be timed to allow for an overshoot/undershoot. Minimizing the time interval until the LED is stable at the desired intensity improves the overall efficiency.

According to the invention, the method of driving an LED driving arrangement comprises the steps of arranging a switched-mode power converter, comprising a number of energy storage elements and a first semiconductor switch, to provide power to an LED load connected across output terminals of the converter; arranging a second semiconductor switch in series with the lighting load; and providing a control means to generate a first control signal for the first semiconductor switch and a second control signal for the second semiconductor switch, such that a transition of the second control signal is delayed relative to a corresponding transition of the first control signal.

The method according to the invention is relatively straightforward to realize, while delivering a noticeable improvement in the behavior of the LEDs at the critical transitions between inactive and active phases.

The dependent claims and the following description disclose particularly advantageous embodiments and features of the invention. Features of the embodiments may be combined as appropriate. Features described in the context of one claim category can apply equally to another claim category.

The LED driver according to the invention can be used to drive any LED load. Without restricting the invention in any way, it may be assumed that the driver is for use in a DLP application in which a number of LEDs of an LED arrangement is used to direct light at a micro-mirror array. A projection arrangement according to the invention can preferably comprise a separate LED driver for each of a red LED group, a green LED group and a blue LED group.

A DLP system can comprise a dedicated processor realized to control a micro-mirror array and a light source driver on the basis of a video input. Such a processor is generally designed to work with a particular kind of light source driver. For example, the DLP arrangement according to the invention can comprise a processor that is realized to generate control signals on the basis of the desired light intensity of an LED arrangement. For example, a "dim command" can indicate the desired light intensity as a fraction or percentage such as 73% and a "strobe request" can indicate the duration over which the LED arrangement is to provide light. The task of the LED driver is to generate a gate signal for the converter switch and a gate signal for the load switch in order to achieve the desired power level.

To this end, the LED driver provides a converter switch gate signal that generally comprises a series of on/off pulses over the duration for which the power converter should run in continuous mode, and a load switch gate control signal which generally comprises a signal that is "on" for the active interval of the LED arrangement, and "off" for the inactive interval.

In one approach, the method according to the invention comprises a step of predetermining a delay for the load switch gate signal transition relative to the converter switch gate signal transition. In other words, after a first rising edge of the converter switch gate signal, a delay is allowed to elapse before the load switch gate signal is applied to the gate terminal of the load switch, for example to pull high the gate terminal of a FET. This delay can be determined during a design phase, and can be applied in some suitable manner. For example, in a preferred embodiment of the invention, a state machine unit is used to generate the load switch gate signal using the predetermined delay value. Such a state machine unit can comprise an off-the-shelf module that can be incorporated in the LED driver or in the projection arrangement. The state machine can be connected to relevant control signals originating from a DLP processor, for example a dim control signal and a strobe request signal, etc., in order to generate the gate signals for the converter switch and load switch.

In the following, it may also be assumed that the switched-mode power converter is a boost converter that can be operated in continuous mode by switching the first semiconductor switch at a suitably fast rate. To this end, the converter switch gate signal generally comprises a series of on/off pulses during an active phase, and remains off during an inactive phase. During an active phase, the duty cycle of the converter switch gate signal, i.e. the duration of the "on" and "off" times, is based on the charge/discharge rates of the energy-storage elements, so that the voltage at the output of the power converter is maintained at a desired level during the active phase of the converter switch gate signal. Without restricting the invention in any way, it may be assumed that the energy storage elements of the boost converter comprise an inductor and a capacitor. The converter switch gate signal may be assumed to comprise a series of uniform pulses during an active phase, wherein consecutive pulses are separated by a pulse off-time. The load switch gate signal may be referred to as the "strobe" signal, since it switches the LED light source between its "on" and "off" states. The strobe signal is effectively "on" during an active phase and "off" during an inactive phase of the LED arrangement.

During an inactive phase, as mentioned above, the converter switch gate signal remains off to keep the converter switch "open", with the result that the inductor current is zero and the voltage across the capacitor remains at its previously attained level. An active phase commences with one relatively long "on" pulse of the converter switch gate signal to allow the inductor current to rise from zero to its peak value. During this time, energy stored in the capacitor can discharge through the load once the load is turned on by the strobe signal. This first pulse is followed by a series of shorter pulses timed so that the inductor current fluctuates between a lower value and the peak value. The voltage across the capacitor will also exhibit some ripple about an output voltage level. The end of an active phase occurs after the last converter switch gate pulse and once the strobe signal has gone low. The inductor current falls to zero, thereby transferring some of its energy to the capacitor, so that the voltage across the capacitor rises to a level that is higher than the output voltage level during the active period.

The energy transfer to the capacitor at the end of the active phase, and its subsequent release through the load at the beginning of the next active phase is the reason for the noticeable overshoot on the LED current when the load is driven using the known LED driver arrangements, i.e. with simultaneous leading edges of the gate signals. This in turn results in a corresponding overshoot/undershoot on the light output. In the LED driver according to the invention, the strobe signal timing is adjusted to alter the energy transfer so that, at the beginning of an active phase, the capacitor voltage is neither too high nor too low, essentially eliminating an overshoot/undershoot on the LED current and light output. To this end, in a preferred embodiment of the invention, the control means is realized to time the transitions of the strobe signal relative to the converter switch gate signal according to energy stored in the energy storage elements.

In a first preferred embodiment of the invention, the control means turns the strobe signal on (from "low" to "high") only after the inductor current has reached a certain threshold level. Effectively, the control means delays the leading edge of the strobe signal relative to the first leading edge of the converter gate signal. The effect of this delay is to allow the capacitor to discharge sufficiently so that when the inductor subsequently fully discharges all its excess energy (due to the offset current from running in continuous mode) into the capacitor, the capacitor voltage will remain at a level that is close to the normal operating range, i.e. the capacitor voltage will not increase significantly above the level it reaches during the active phase. In contrast, the conventional LED drivers are characterized by a significant difference between capacitor voltage levels in the active and inactive phases.

The threshold level of inductor current can correspond to the minimum current level during continuous mode operation. The threshold level of inductor current is preferably an inductor current level reached at the end of an active phase, i.e. after the final gate pulse. This threshold level lies between the maximum (peak) and minimum (zero) inductor current levels. The time taken for the inductor current to rise to this threshold level from zero at the beginning of an active phase can be determined in a number of ways. For example, the inductor current can be monitored at the end of an active phase to detect an instant at which it has dropped to zero. In the meantime, a counter can be controlled to count up during this interval.

Alternatively, the time can be computed using known and/or estimated values. For example, the delay can be estimated using the following reasoning: at the end of an active phase, the converter switch is turned off; the inductor current at this time is the threshold level; and the energy stored in the inductor will be dissipated by the LED arrangement as long as the strobe signal is "on". Therefore, $$I_{LED} \cdot V_{LED} \cdot t_{delay} = \frac{1}{2} I_{L(t0)}^2 \cdot L \quad (1)$$

where $I_{LED}$ is the current through the LED arrangement, $V_{LED}$ is the voltage across the LED arrangement, $t_{delay}$ is the time by which the strobe signal will be extended while the inductor is discharging, $I_{L(t0)}$ is the threshold inductor current, and L is the inductor value. The equation can be re-arranged to give:

$$t_{delay} \approx \frac{\frac{1}{2} I_{L(t0)}^2 \cdot L}{I_{LED} \cdot V_{LED}} \quad (2)$$

The estimated time is an approximation, since the LEDs behave in a non-linear manner. The inventive concept is based on the insight that the power in the inductor—at the instant at which the converter is turned off—is higher than needed to drive the LEDs, and the excess energy will charge the capacitor. However, the power of the inductor decreases over time, and eventually drops below a level that is needed to run the LEDs. At this point the capacitor discharges into the LEDs. The principle of the invention is to find a balance between the amount of energy transferred from the capacitor into the load after the converter is turned off, and the amount of energy remaining in the capacitor when the load is turned off. The delay computed above will leave the load switch closed long enough so that the capacitor can discharge to a level that is not enough to cause an overshoot on startup, i.e. at the beginning of the next active phase, but also not so low as to cause undershoot on startup.

The trailing edge of the strobe signal should preferably be delayed for at least as long as the interval between consecutive converter gate pulses. Therefore, in a preferred embodiment of the invention, the control means comprises a pulse interval measurement means for measuring the converter gate pulse off-time interval. For example, a suitable counter can be triggered by a converter gate pulse trailing edge after having been reset to zero by the preceding converter gate pulse leading edge. The next converter gate pulse leading edge can be used to store the accumulated off-time interval count value. In a preferred embodiment of the invention, this converter gate pulse off-time interval may then be used as a minimum time by which the strobe on/off transition is delayed relative to the final trailing edge of the converter gate signal.

According to the invention, the strobe signal is applied to the LED load switch sometime after the leading edge of the first converter gate pulse during an active phase. In a preferred embodiment of the invention, the control means applies the strobe signal when the inductor current has risen from zero to a level similar to its level at a trailing edge of the strobe signal. In one preferred embodiment of the invention, the control means comprises a discharge monitoring circuit for measuring a discharge time of the inductor. In this embodiment, the time required for the inductor current to reach zero at the end of an active phase is measured and used as a starting value for a counter. The next converter gate pulse leading edge after the intervening inactive phase triggers this counter to count down. When it reaches zero, the strobe signal goes high. This embodiment is based on the knowledge that the slope of rising inductor current is similar to the slope of falling inductor current. In reality, the inductor current will reach the desired offset level slightly later than the counter reaches zero, since the inductor current rising edge slope is slightly less steep than the falling edge slope.

In an alternative approach, the delay of the second control signal transition relative to the first control signal transition is not a predetermined value, but is instead determined on an ad hoc basis. For example, a suitable delay time can be estimated by measuring how long it takes for the inductor to discharge completely, starting from a desired "switch on" level or offset level. In other words, it can be assumed that the inductor current slope is the same during a rising condition and a falling condition. As explained above, the principle of the invention is to issue the converter gate signal for the second FET only after the inductor current has reached the desired offset level or "threshold" level. This offset level can be computed for a specific power converter. Therefore, the LED driver according to the invention can comprise a circuit that measures the time taken for the inductor current to drop from this offset level to zero after the last pulse of the dim control pulse series. This can be achieved by triggering a counter to count upwards from zero until the inductor current has reached a value of zero, at which point the counter is stopped and retains its value. Subsequently, after an interval of inactivity, when a new series of converter switch pulses are issued, the first pulse can trigger the counter to count down until it once again reaches zero. During this time, the inductor current is rising towards the offset or threshold level. Once the counter reaches zero, the load switch gate signal goes from 0 to 1, and the LEDs are switched on.

The effect of applying this inductor current offset (whether using a predetermined value or a measured value for the threshold current) is that, after the final converter switch gate pulse, the power converter is turned "off", but the LED load continues to draw current. This has the effect that some of the stored energy is transferred into the LED load, thus preventing the capacitor voltage from reaching an undesirably high level, with the result that less "excess energy" can remain in the capacitor to discharge into the load at the beginning of the next active phase. Effectively, the invention is to achieve an improved energy balance at the beginning and/or end of an active phase. For example, in the case of a boost converter, there is no current delivered to the load when the inductor current is increasing, so the best time to turn on the converter switch is when the capacitor voltage is close to the minimum voltage it would have during continuous mode operation. Since the capacitor voltage would generally be higher than this level (on account of the energy transfer at the previous active phase, as explained above), turning on the converter switch earlier than the load switch allows the capacitor to discharge slightly. In the case of a buck converter, current is always delivered to the capacitor, however at the start of an active phase, it is inadequate the power the LED arrangement and would therefore lead to undershoot. Therefore, with a buck converter, the best time to turn on the load switch is when the inductor current reaches the minimum it would during continuous mode operation, adjusted if necessary to account for extra energy in the capacitor.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
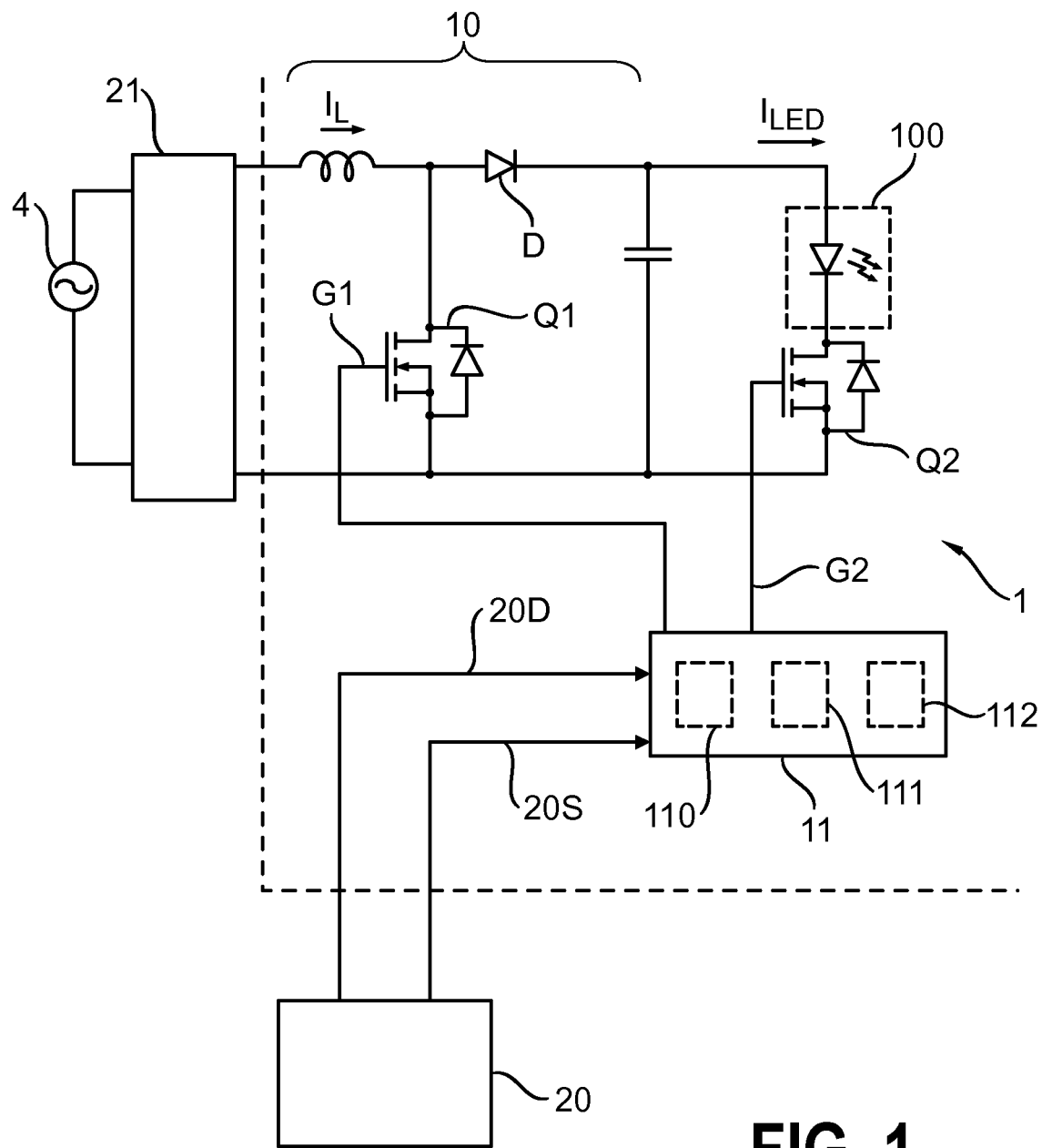
FIG. 1 shows a simplified block diagram of an embodiment of an LED driver according to the invention.

FIG. 1 shows a simplified block diagram of an LED driver 1 according to an embodiment of the invention. The LED driver 1 is realized to drive an LED lighting load 100 that can comprise any appropriate number and arrangement of LEDs, and is shown in relationship to a processor 20 and power converter 21 of a DLP system. The DLP processor 20 issues a dim level 20D and a strobe request 20S to the LED driver 1. The strobe request 20S is used to regulate the "on time" of the LEDs, while the dim level 20D is used to regulate the light intensity in the projected image. Here, the LED driver 1 comprises a boost converter 10 that is provided with a rectified input from a power converter 40 driven from a mains power supply 4. The boost converter 10 comprises a known arrangement of inductor L, diode D, capacitor C, and semiconductor switch Q1, referred to as the "converter switch" in the following. In this embodiment, the switch Q1 is a MOSFET. A second semiconductor switch Q2 is arranged in series with the LED load 100, as is referred to as the "load switch" in the following. The load switch Q1 is also a MOSFET in this exemplary embodiment. Gate signals G1, G2 for the converter switch Q1 and load switch Q2 are generated by the driver 1 on the basis of the dim level 20D and strobe request 20S signals provided by the DLP processor 20. The driver 1 according to the invention can generate the converter switch signal G1 in the usual manner, i.e. with the usual timing, but allows a certain delay to elapse at least before a 0-1 transition of a load switch signal G2, as discussed above. During an active phase (during which light should be cast onto a micro-mirror device of the projection system), the converter switch signal G1 essentially comprises a series of on/off pulses to operate the boost converter in continuous mode. The timing of the duration of active phases and intervening inactive phases has the effect of regulating the light intensity for each image being projected. In a conventional realization, the leading edges of the control signals for the switches Q1, Q2 are issued simultaneously, resulting in the unfavorable overshoot on the output.

In the LED driver 1 in this exemplary embodiment, the leading edge of the load switch signal G2 is offset or delayed relative to the leading edge of the first pulse of the converter switch signal G1, and the trailing edge of the load switch signal G2 is offset or delayed relative to the trailing edge of the last pulse of the converter switch signal G1. The outcome of this control approach is to effectively eliminate the overshoot on the LED current $I_{LED}$. The control means 11 can achieve this in a number of ways. In one embodiment, the control means 11 can make use of a state machine module 111. The state machine can be set up to monitor the status of relevant signals and counters as described above. To detect the final pulse of the converter switch gate signal, indicating the end of an active phase, the control means 11 can comprise an interval measuring circuit 112. This can comprise a counter that is reset to zero by a leading edge of the converter switch gate pulse, and is made to count upwards by a final trailing edge of the converter switch gate pulse. The absence of a pulse leading edge indicates the end of an active phase. When the state machine 111 detects the end of the active phase, it can start to observe the inductor current $I_L$ level to determine an optimal time at which to turn off the load switch signal G2, i.e. to generate the trailing edge of the load switch signal G2. A discharge time measuring circuit 110 can be connected to the inductor L and can comprise a counter which is triggered by the state machine 111 to start incrementing until the inductor current has dropped to zero. This discharge time can be recorded in a memory of the control means 10. At the next active phase, which starts with a new converter switch gate pulse leading edge, a counter can be made to count down from this recorded value. When the counter reaches zero, the load switch is turned on by activating the load switch gate signal or strobe signal.

Figure 6:
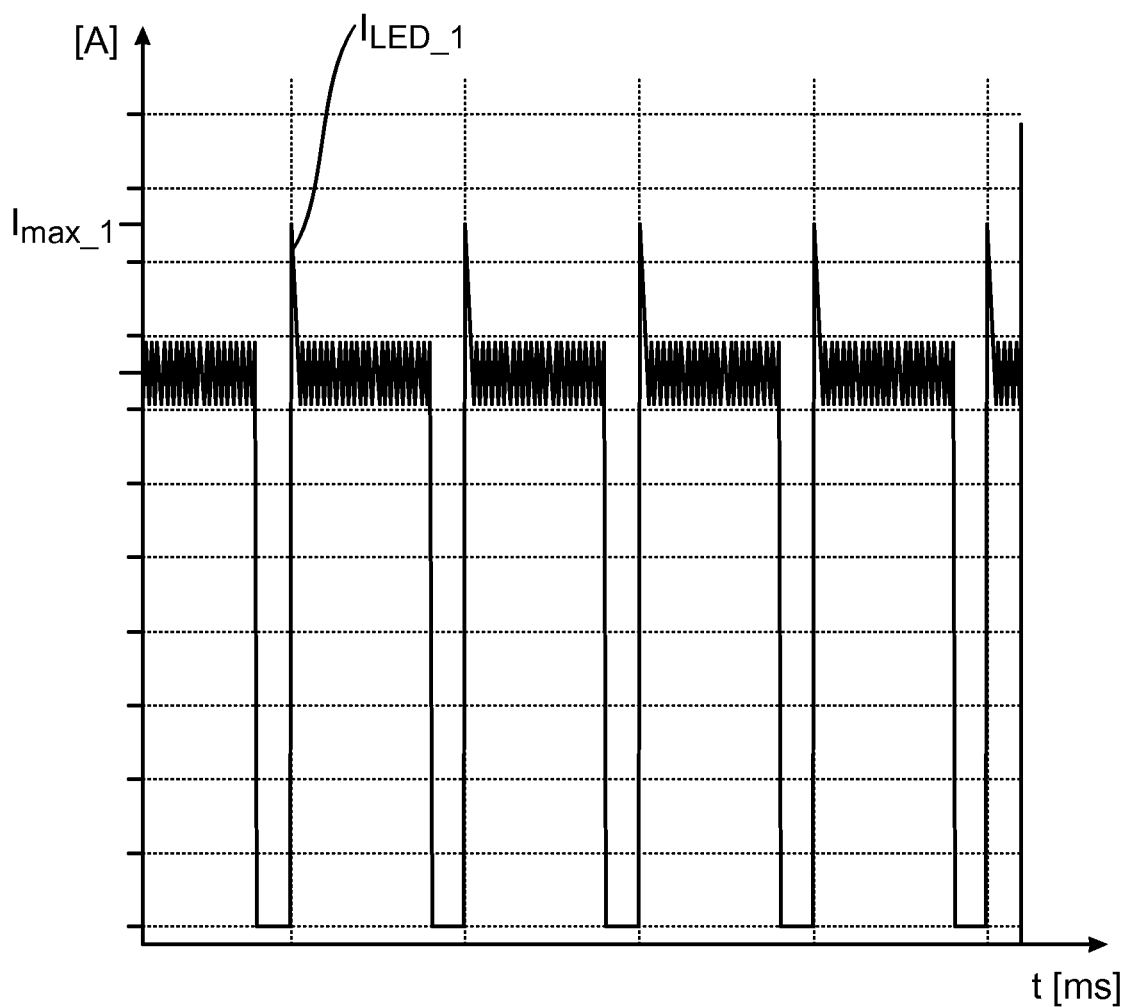
FIG. 6 shows an LED current waveform during operation of a prior art LED driver.
Figure 7:
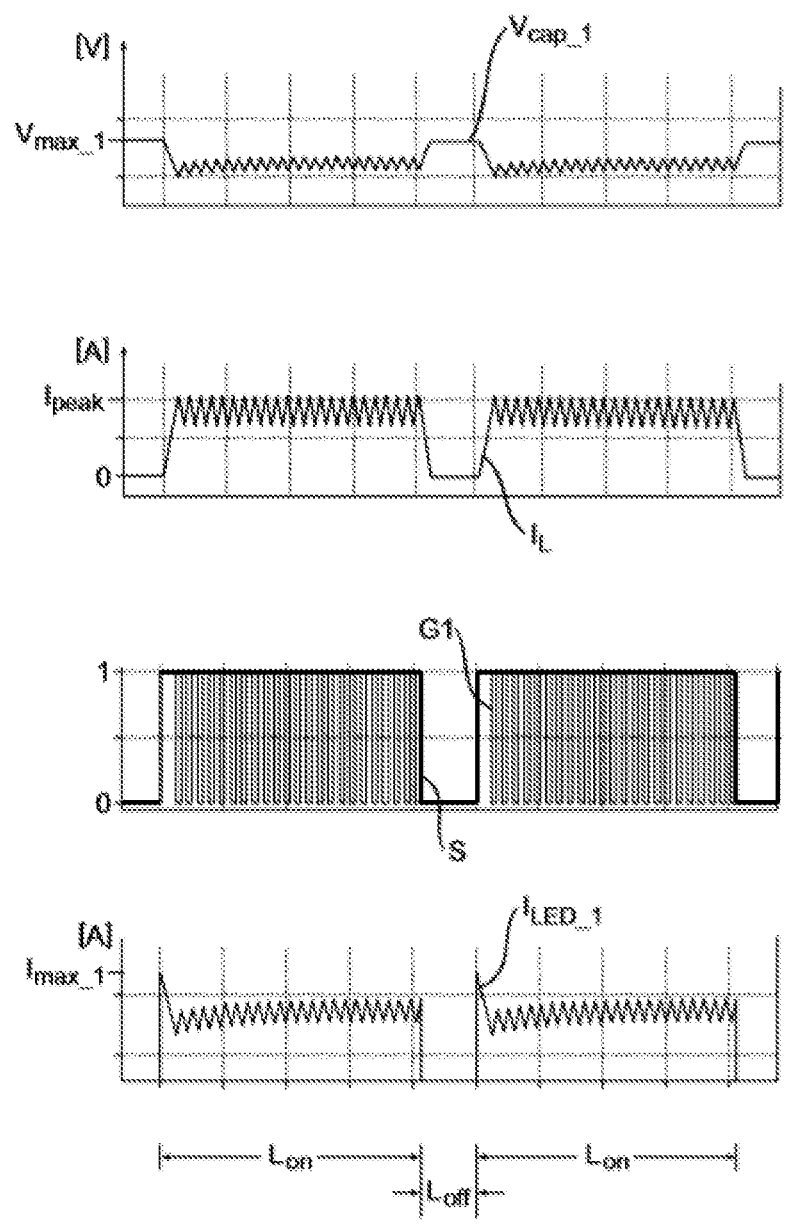
FIG. 7 shows signal waveforms during operation of a prior art LED driver.

This improved control technique essentially eliminates the overshoot problem experienced in prior art LED drivers. FIG. 6 illustrates this overshoot problem and shows the LED current $I_{LED}$ through an LED load driven by a prior art LED driver using a boost converter as described above. At the beginning of each active phase (during which the LEDs are "on"), the LED current $I_{LED}$ noticeably overshoots the average target current level of about 3.75 A. This overshoot affects the light output accordingly, and can be perceptible to the viewer. The cause of this undesirable behavior is illustrated in FIG. 7, which shows signal waveforms during operation of the prior art LED driver. From top to bottom, the diagram shows the capacitor voltage $V_{cap}$, inductor current $I_L$, converter switch signal 70 and load switch signal 71 as issued by the prior art driver, and LED current $I_{LED\_1}$ for a series of alternating active phases $L_{on}$ and inactive phases $L_{off}$. At the end of an active phase $L_{on}$, the trailing edge of the load switch signal 71 occurs after a pulse interval (after which a pulse leading edge would appear in an active phase). As a result, at the end of each active phase $L_{on}$, energy from the inductor is transferred to the capacitor, causing its voltage to increase to a relatively high maximum value $V_{max\_1}$, and stored there during the subsequent inactive phase $L_{off}$. The leading edges of the converter switch signal 70 and load switch signal 71 arrive simultaneously, with the result that the LEDs are switched on immediately. The excess energy in the capacitor can only discharge through the LEDs, with the result that the LED current $I_{LED\_1}$ overshoots as described above to a relatively high maximum value $I_{max\_1}$.

Figure 2:
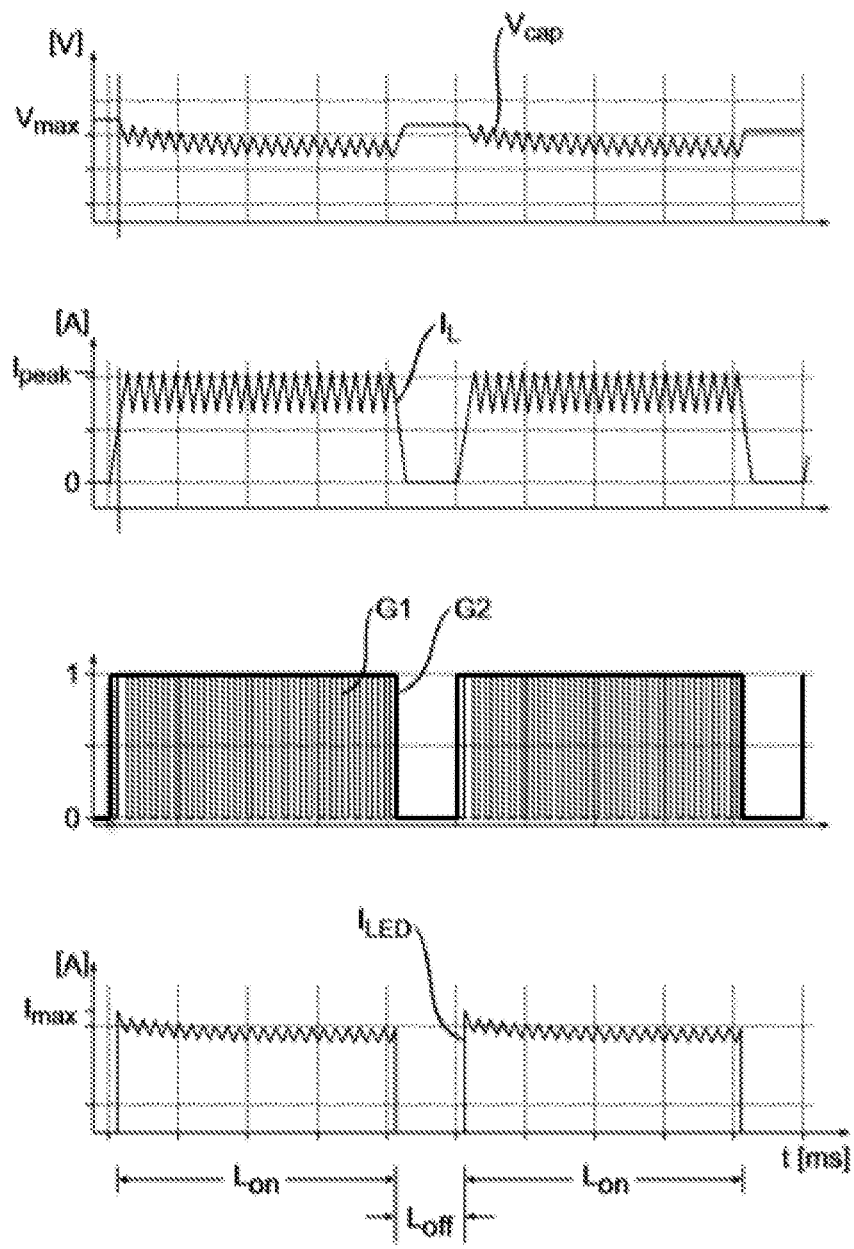
FIG. 2 shows signal waveforms during operation of an LED driver according to the invention.
Figure 3:
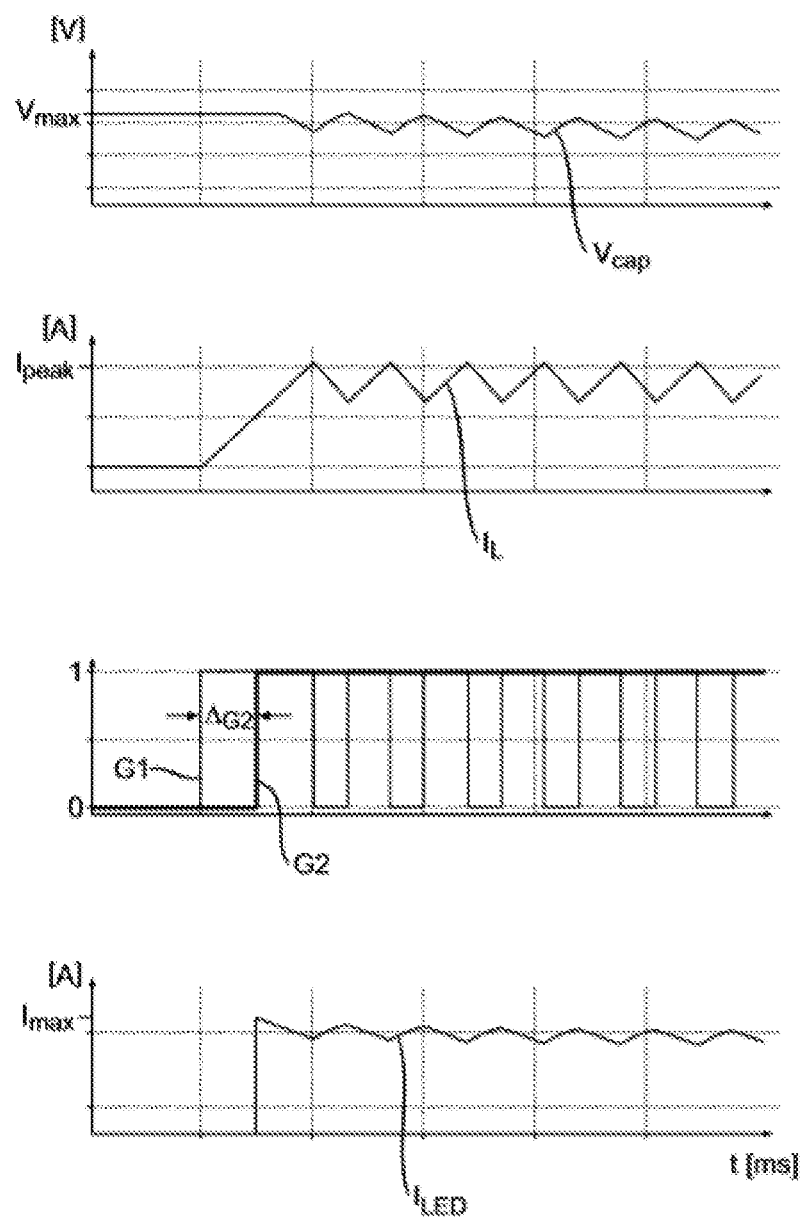
FIG. 3 shows the signal waveforms of FIG. 2 at commencement of an active phase.

FIG. 2 shows signal waveforms during operation of an LED driver according to the invention. From top to bottom, the diagram shows the capacitor voltage $V_{cap}$, inductor current $I_L$, the converter switch signal G1 and the load switch signal G2 as issued by the control means, and LED current $I_{LED}$. In contrast to the waveforms described above with the aid of FIGS. 6 and 7, the LED current $I_{LED}$ clearly exhibits a more favorable shape, without any significant overshoot following its off/on transition, effectively reaching only a relatively low maximum $I_{max}$. This is on account of the relatively low capacitor voltage $V_{max}$ stored during an inactive phase $L_{off}$. FIG. 3 shows a region of FIG. 2 about a leading edge of the load switch signal G2, i.e. at commencement of an active phase $L_{on}$. The load switch signal G2 goes from 0 to 1 later than the first leading edge of the converter switch signal G1, by a delay $\Delta_{G2}$. This delay $\Delta_{G2}$ can correspond to the delay $t_{delay}$ as computed using equation (2), for example. Until the load switch signal G2 goes high, the LEDs 100 are "off". The effect of this delay or offset $\Delta_{G2}$ is that the load switch is only turned on when the converter is able to provide enough current to keep the LED current $I_{LED}$ roughly constant. This avoids undershoot on the LED current $I_{LED}$.

Then, when the load switch signal G2 goes high, the LEDs 100 are switched on, but the lower voltage $V_{max}$ previously stored in the capacitor C ensures that the LED current $I_{LED}$ does not overshoot.

Figure 4:
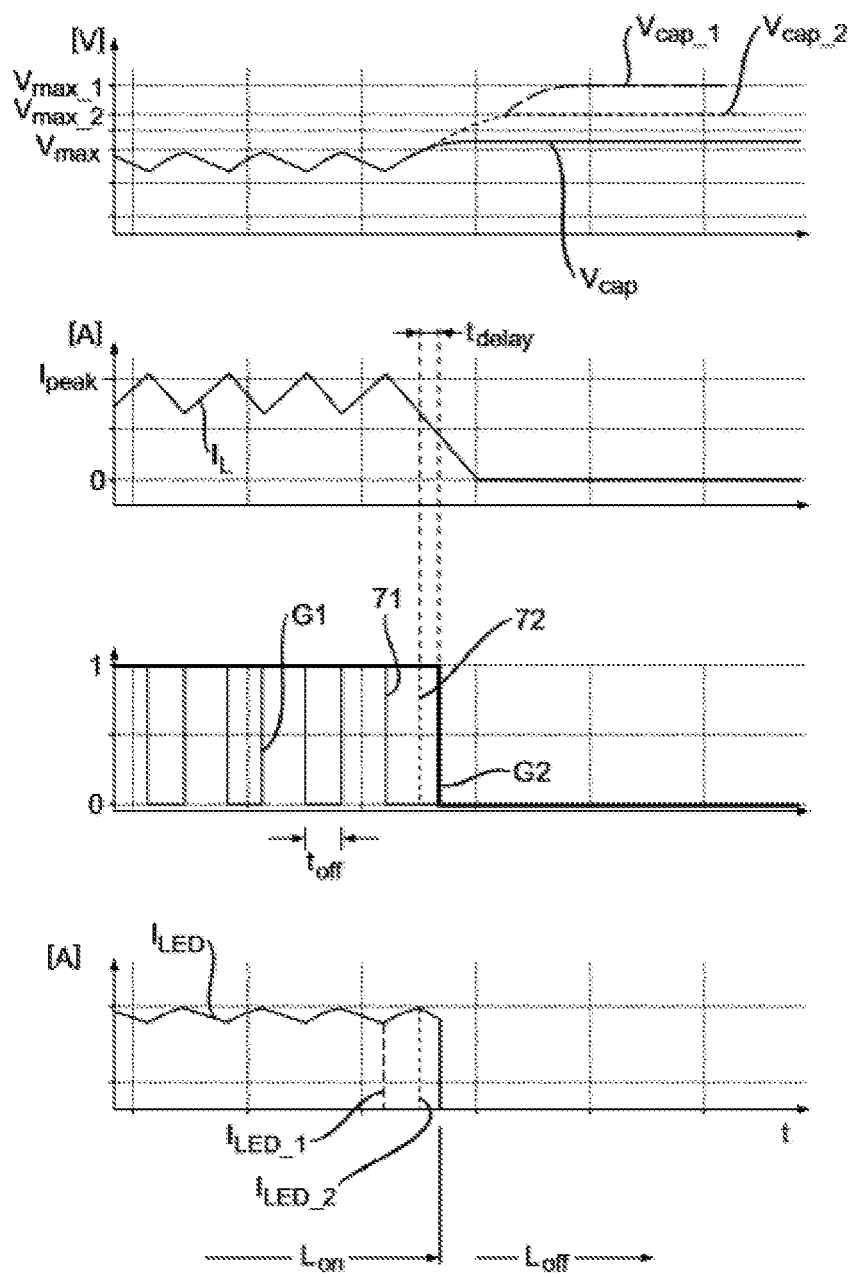
FIG. 4 shows the signal waveforms of FIG. 2 at termination of an active phase.

The reason for the lower capacitor voltage $V_{cap}$ is given in FIG. 4, which shows the signal waveforms of FIG. 2 at the termination of an active phase $L_{on}$. Instead of dropping to zero at the same time as the trailing edge of the converter switch signal G1, or after an off-time interval $t_{off}$ has elapsed, the trailing edge of the load switch signal G2 is delayed until the inductor current $I_L$ has dropped to a threshold level. In this example, the delay $t_{delay}$ is computed or measured from a time corresponding to the off-time interval $t_{off}$ after the trailing edge of the converter switch signal G1. A computed value for the delay $t_{delay}$ can be based on equation (2), for example. During this prolonged delay $t_{delay}$, the boost converter is off and the inductor is discharging, but the LED load is still drawing current, so that less energy can be transferred to the capacitor C. As a result, by the time the load switch signal G2 drops to zero to also turn off the load, the capacitor voltage $V_{cap}$ has not increased significantly above its maximum ripple voltage, as shown in the upper portion of the diagram. For comparison, the diagram also shows the trailing edges of prior art load switch signals 71, 72 and the corresponding LED current $I_{LED\_1}$, $I_{LED\_2}$ and capacitor voltage waveforms $V_{cap\_1}$, $V_{cap\_2}$ that would result. If the load switch signal trailing edge coincides with the final gate pulse trailing edge, the LED load immediately stops drawing current $I_{LED\_1}$, and the capacitor is charged to a relatively high level $V_{cap\_1}$ by the discharging inductor. These waveforms are indicated by the broken lines. The unfavorably high voltage level $V_{cap\_1}$ will result in significant overshoot on the LED current $I_{LED\_1}$ at the beginning of the next active phase. Even if the strobe signal trailing edge is delayed until after an off-time interval $t_{off}$, as indicated by the waveforms drawn with dotted lines, the capacitor will still charge to a level $V_{cap\_2}$ by the discharging inductor, and the LED current $I_{LED\_2}$ will also suffer from overshoot at the beginning of the next active phase $L_{on}$, as already explained with the aid of FIGS. 6 and 7.

Figure 5:
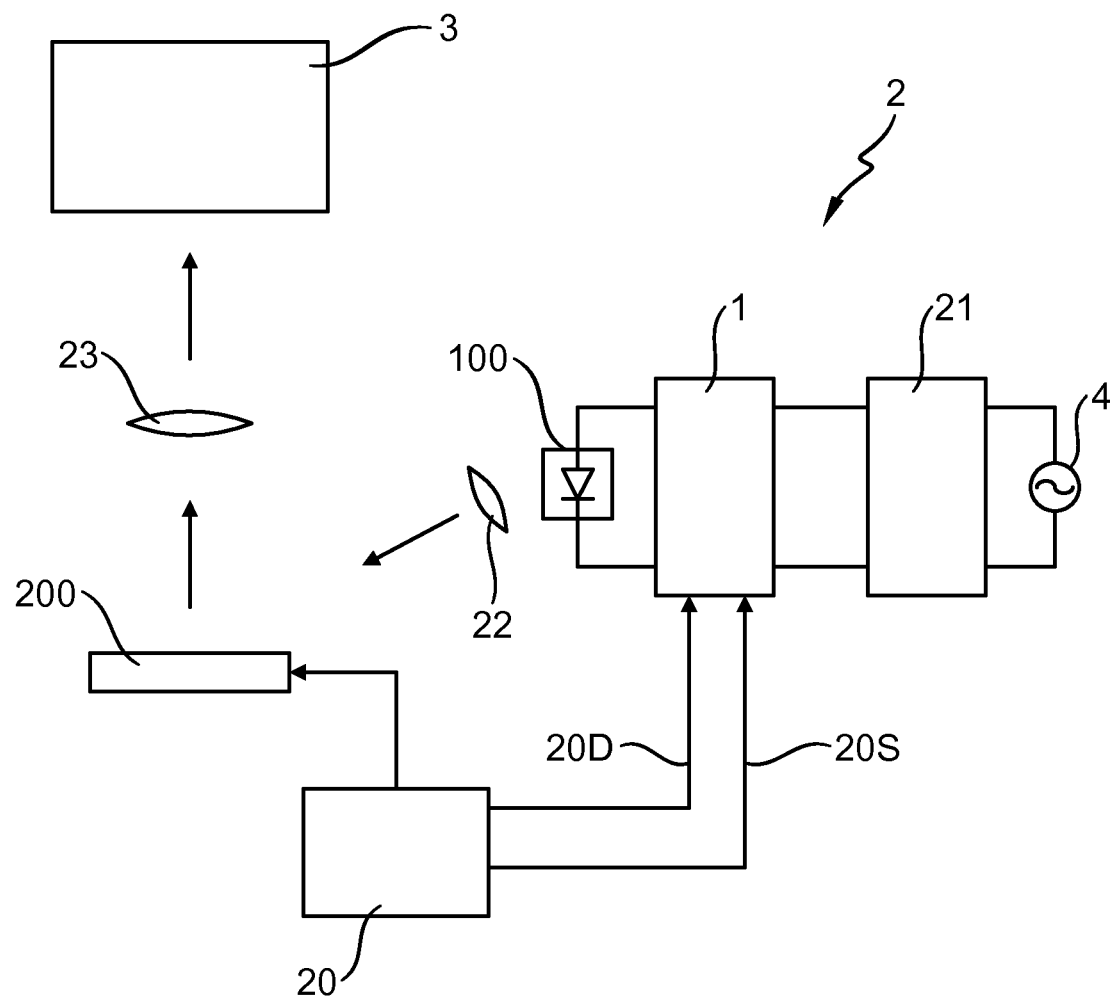
FIG. 5 is a schematic representation of an embodiment of a projection arrangement according to the invention.

FIG. 5 is a schematic representation of an embodiment of a projection arrangement 2 according to the invention. Power is provided from a mains supply 4 and an input converter stage 21. The diagram shows a micro-mirror device 200, with an array of moveable mirrors controlled by a DLP processor 20. The processor 20 also issues synchronized control signals for a lighting arrangement, in this case an LED arrangement 100 driven by an LED driver 1 according to the invention. The diagram shows a pair of control signals 20D, 20S for one LED arrangement 100. As the skilled person is aware, various sets of control signals can be issued, depending on the number of separately controllable LED arrangements (e.g. for the different colors red, blue, green and white). During operation, light pulses are generated in rapid succession by an LED driver 1 and its LED lighting load 100, and directed at the micro-mirror device 200, which casts the resulting image onto a screen 3. Various optical arrangements 22, 23 focus and shape the light as required.

Although the present invention has been disclosed in the form of preferred embodiments and variations thereon, it will be understood that numerous additional modifications and variations could be made thereto without departing from the scope of the invention. For example, instead of using separate LED arrangements for independently generating red, blue and green light, a white LED light source could be used in combination with a color wheel in a manner that will be known to the skilled person. In such a realization, the white LED light source is driven using a driver according to the invention, thereby achieving a very precise timing for the light.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A light emitting diode (LED) driver comprising:
    a switched-mode power converter for providing power to an LED arrangement connected across output terminals of the converter, and wherein the converter comprises a number of energy storage elements (L, C) and a first semiconductor switch (Q1);
    a second semiconductor switch (Q2) connected in series with the LED arrangement;
    a controller to generate a second control signal (G2) for the second semiconductor switch (Q2), such that a transition of the second control signal (G2) is delayed relative to a corresponding transition of a first control signal (G1) for the first semiconductor switch (Q1);
    wherein the energy storage elements (L, C) includes an inductor (L) and the controller generates a delay of a trailing edge transition of the second control signal (G2) as a function of a current level of the inductor (L).

2. The LED driver according to claim 1, wherein the energy storage elements (L, C) comprise capacitor (C), and wherein the controller times the transitions of the second control signal (G2) relative to the first control signal (G1) according to an energy transfer between the energy storage elements (L, C).

3. The LED driver according to claim 2, wherein the controller generates the delay of the trailing edge transition of the second control signal (G2) as a function of the current level of the inductor (L) which is a threshold inductor current such that the delay make the power of the inductor decrease over time, and eventually drop below a level that is needed to run the LED.

4. The LED driver according to claim 1, wherein the controller delays a trailing edge transition of the second control signal (G2) relative to a trailing edge transition of the first control signal (G1) by an amount exceeding an interval ($t_{off}$) between consecutive pulses of the first control signal (G1).

5. The LED driver according to claim 3, wherein the controller measures an interval ($t_{off}$) between consecutive pulses of the first control signal (G1).

6. The LED driver according to claim 1, wherein a leading edge transition of the second control signal (G2) is delayed relative to a leading edge transition of the first control signal (G1) by an amount corresponding to a discharge time ($t_{delay}$) of the inductor (L).

7. The LED driver according to claim 6, wherein the controller comprises a discharge monitoring circuit for measuring the discharge time ($t_{delay}$) of the inductor (L).

8. The LED driver according to claim 1, wherein the second control signal (G2) is derived from a strobe signal (S) issued by a processor of a projection arrangement.

9. The LED driver according to claim 1, comprising a state machine module realized to generate at least the second control signal (G2).

10. A projection arrangement comprising:
    a digital micro-mirror device for projecting an image onto a screen;
    a light emitting diode (LED) arrangement for directing light at the micro-mirror device;
    a processor for controlling the micro-mirror device and for generating control signals (G1, S) for a driver of the LED arrangement; and
    at least one LED driver according to claim 1 for driving the LED arrangement.

11. The projection arrangement according to claim 10, comprising a separate LED driver for each of a red LED group, a green LED group and a blue LED group of the LED arrangement.

12. A method of driving a light emitting diode (LED) arrangement, comprising the steps of:
    arranging a switched-mode power converter comprising at least a number of energy storage elements (L, C) and a first semiconductor switch (Q1) to provide power to the LED arrangement connected at the output of the converter;
    arranging a second semiconductor switch (Q2) in series with the LED arrangement;
    providing a control means to generate a second control signal (G2) for the second semiconductor switch (G2), such that a transition of the second control signal (G2) is delayed relative to a corresponding transition (G1) of a first control signal (G1) for the first semiconductor switch (Q1); and
    wherein the energy storage elements (L, C) comprise an inductor (L) and the step of providing the control means (11) comprising generating a delay of a trailing edge transition of the second control signal (G2) as a function of a current level of the inductor (L).

13. The method according to claim 12, wherein generating the delay of the trailing edge transition of the second control signal (G2) as a function of the current level of the inductor (L) which is a threshold inductor current such that the delay make the power of the inductor decrease over time, and eventually drop below a level that is needed to run the LED, and comprising a step of predetermining a delay ($t_{delay}$, $\Delta_{G2}$) for a leading edge transition of the second control signal (G2) relative to a leading edge transition of the first control signal (G1).

14. The method according to claim 12, comprising a step of measuring a delay ($t_{delay}$, $\Delta_{G2}$) for a leading edge transition of the second control signal (G2) relative a leading edge transition of the first control signal (G1).

15. The method according to claim 12, comprising a step of measuring a discharge time ($t_{delay}$) of an energy element (L) of the power converter.

* * * * *